United States Patent
Andersen

[11] Patent Number: 5,826,693
[45] Date of Patent: Oct. 27, 1998

[54] MAGAZINE ARRANGEMENT

[75] Inventor: Anders Andersen, Solbjerg, Denmark

[73] Assignee: Maskinfabrikken Hojvang APS, Solbjerg, Denmark

[21] Appl. No.: 750,579

[22] PCT Filed: Jun. 7, 1995

[86] PCT No.: PCT/DK95/00228

§ 371 Date: Feb. 19, 1997

§ 102(e) Date: Feb. 19, 1997

[87] PCT Pub. No.: WO95/34493

PCT Pub. Date: Dec. 21, 1995

[30] Foreign Application Priority Data

Jun. 14, 1994 [DK] Denmark ................................. 0675/94

[51] Int. Cl.⁶ ................................................ B65G 1/00
[52] U.S. Cl. ...................................... 198/347.1; 198/580
[58] Field of Search ............................. 198/347.1, 347.2, 198/347.3, 580; 414/790.7, 793.8, 794.4, 794.5, 795.6

[56] References Cited

U.S. PATENT DOCUMENTS

| | | | |
|---|---|---|---|
| 4,367,619 | 1/1983 | Lorsch | 53/245 |
| 4,466,530 | 8/1984 | Stückler | 198/580 X |
| 4,488,633 | 12/1984 | Kampf | 198/580 |
| 4,632,621 | 12/1986 | Lable | 221/198 |

FOREIGN PATENT DOCUMENTS

| | | | |
|---|---|---|---|
| 3437004 | 5/1985 | Germany | 198/347.1 |
| 32715 | 7/1921 | Norway . | |
| WO 89/10319 | 11/1989 | WIPO . | |

Primary Examiner—James R. Bidwell
Attorney, Agent, or Firm—Cushman Darby & Cushman IP Group of Pillsbury Madison & Sutro LLP

[57] ABSTRACT

A magazine arrangement (1) comprises a number of lengthy, open cassettes (2), serving to accomodate stacks of e.g. can lids (5). The arrangement comprises furthermore an apparatus (3) with an inclined stand (4). The cassettes (2) are transported through the apparatus along a first, a second and a third path (7; 13 and 14). In the first path (7) there is a device (6) for charging or discharging a cassette. The second and third path (13, 14) extends horizontally in a direction perpendicular to the first path (7) and serves for carrying empty or charged cassettes to or from this path (7) and at the same time being able to accumulate a supply of such cassettes. During the passage of the apparatus the cassettes (2) are standing upright with forwards turning opening. The inclination of the stand (4) and thereby the inclination of the cassettes has the consequence that the apparatus (3) can function without guides to prevent the cassettes (2) from tilting. The inclination will furthermore prevent the lids (5) from falling out of the opening of the cassettes (2) and secures that the stack of lids by themselves will fall correctly in position in the cassettes (2). The apparatus (3) therefore is simple and easy to operate.

12 Claims, 1 Drawing Sheet

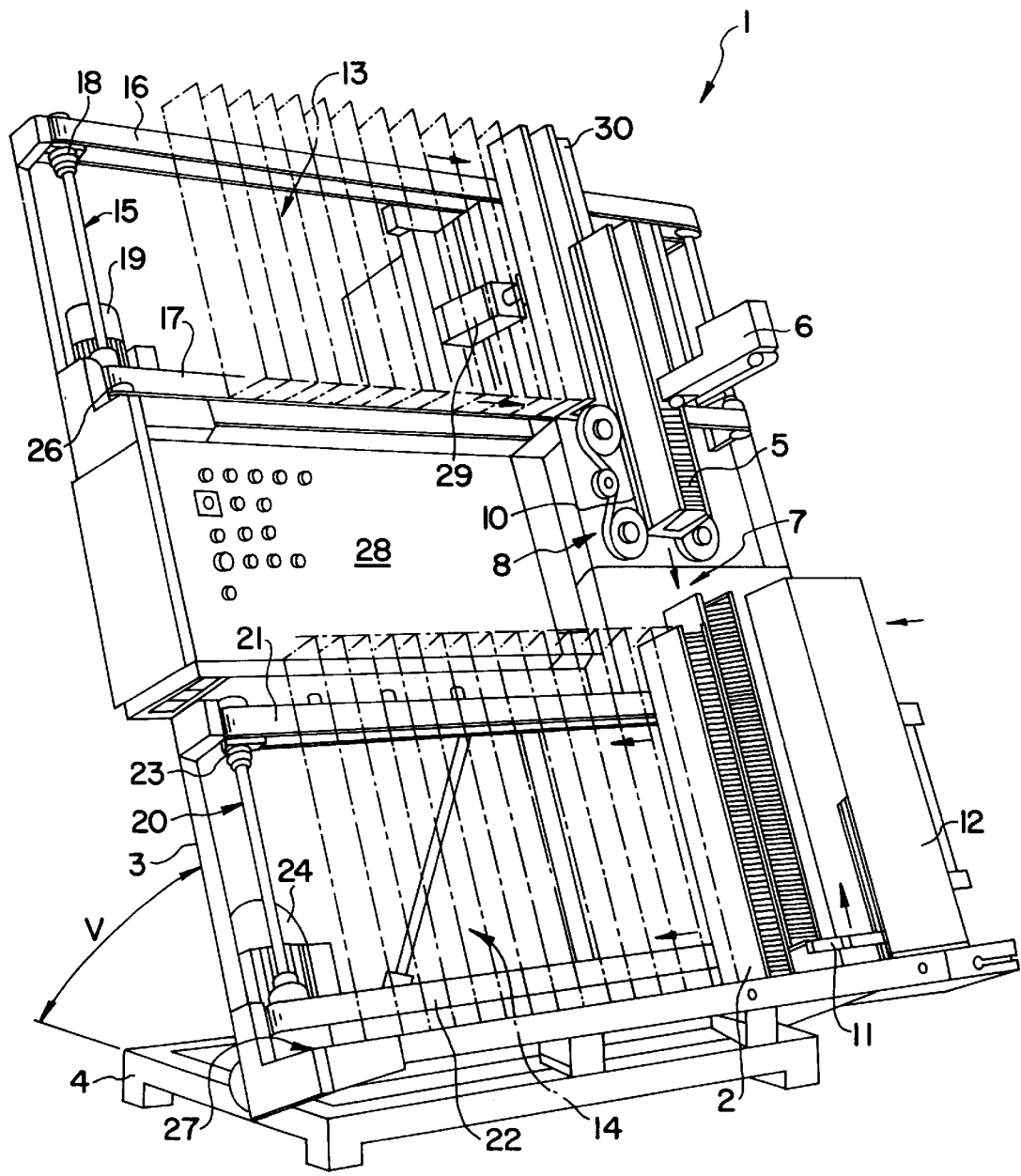

MAGAZINE ARRANGEMENT

BACKGROUND OF THE INVENTION

1. Field of the Invention

The invention concerns a magazine arrangement, comprising a number of open, lengthy cassettes each accommodating a stack of flat objects, such as can lids, and also an apparatus, which has a first path for lengthways carrying the cassettes separately past a charge and/or discharge unit for charging or discharging the cassettes, a second path in front of the first one to accumulate a desired number of cassettes and to carry these cassettes one at a time crosswise to the first path, and a third path, after the charge and/or discharge unit, for carrying one at a time the cassettes which have left the charge and/or discharge unit, crosswise along the first path and accumulate a desired number of these cassettes after this path.

2. Prior Art

Norwegian patent No. 32715 discloses an apparatus for automatically charging lengthy cassettes with can lids. This apparatus has a stand with a frame vertically displaceable up and down in the stand. In this frame there is placed a horizontally displaceable first cassette, with a second cassette being divided in partitions with the same width as a can lid. The lids are manufactured in a press and are successively guided from this press into one of the said partitions whereby the two cassettes at the same time are lowered stepwise until the partition is charged with lids. Then the cassettes are elevated while they at the same time are horizontally displaced in the frame at a distance equal to the width of a lid, whereby a new partition moves into the charging position. The process is repeated until all of the partitions in a cassette have been charged, whereafter the charged cassette can be removed from the right side of the frame. A new, empty cassette has in the meantime been placed in the left side of a guide to the frame so that the apparatus will function without stopping.

The manipulation with these double cassettes is very difficult and requires utmost attention and almost constant supervision from the operating personnel. The first cassette must be placed with accuracy in the guide to the frame in order to make the apparatus function and this operation must take place at the same time as the frame is moving. Another problem is the fact that the cassettes are open in the front and consequently there is a risk for the vertically stacked lids to fall out.

The mechanism in question is furthermore expensive and complicated and is not suitable for following the high production speed existing in modern production plants for manufacturing can lids. The apparatus can, by the way, only be used for charging the cassettes with lids, and the patent specification has no instructions with regard to how they are discharged.

WO patent specification No. 89/10319 discloses a similar apparatus, which however can be used for charging as well as discharging lengthy cassettes, for example, can lids. Also in this case the cassettes are carried upright, horizontally and vertically through the apparatus. During the vertical passage the cassettes are transported separately by means of two endless belts guiding the cassette in question by engaging its sides. The patent specification is essentially silent as to how the cassettes are guided through the plant without tipping over and without the lids falling out of the open front.

If the apparatus is supposed to be able to function with reasonable reliability of operation it must, however, have some sort of a guide for supporting the upright standing cassettes, and thereby the same problems of operation will arise as encountered with the above-mentioned Norwegian patent. Even if the cassettes are secured from tipping over in this way, the lids will continue to be disposed to fall out of the open front of the cassettes. This tendency is an especially great inconvenience for the personnel having to place the charged cassettes in the guide of the apparatus or to discharge the charged cassettes from this guide, and who during this operation very carefully must see to it that all of the lids are correctly in position up against the vertically placed bottom and that no lids fall out of the open front of the cassette.

SUMMARY OF THE INVENTION

The object of the invention is to provide a magazine arrangement which has a simple and reliable construction, is handy to operate, requires minimal working effort and supervision of the operating personnel, and which moreover can function with very high rates of production.

According to the invention, these objectives are achieved in that all three paths in the apparatus are formed in such a way that each of the cassettes during its stay within and passage along a path stands upright with a backwards inclination relative to a vertical plane. Thereby the cassettes are prevented from tipping over as they are supported in the path of the apparatus and are held in abutment against then supports by gravitation. Gravity also provides for the fact that all of the lids appropriately will be stacked in abutment with the bottom of the cassettes and that none will fall out of the open front of the cassettes.

However, if the inclination is exceeded there may be a risk that the stack of lids will slide, and if, on the other hand, the inclination is too little, there is a risk that the lids may not with certainty come into position against the bottoms of the cassettes, and some of them might even fall out. The correct stacking and position of the lids in a cassette is best obtained if the angle at which each of the cassettes is inclined relative to a vertical plane is between 5° and 60°, preferably between 10° and 40°, and especially between 20° and 30°.

The paths of the apparatus are built on a stand and are situated in inclined planes with the same inclination, the second and third paths extending horizontally, each within its own plane, while the first path extends perpendicular to the two other paths. It thus is easy for the operating personnel to place cassettes on the horizontal paths and remove them.

The transportation of cassettes on the horizontal paths can advantageously take place by means of smooth belt conveyers which allow the cassettes to slide in relation to the belt conveyers in carrying the cassettes to and from the first path, and in allowing an accumulation of the cassettes on the horizontal paths.

Also, movement of the cassettes through the first path can advantageously take place by means of one or more belt conveyers, which must not be smooth, but on the contrary must be able to act on a cassette with an adequate high frictional force to overcome the gravitation force.

BRIEF DESCRIPTION OF THE DRAWING

The invention will be explained more fully by the following description of an embodiment, which just serves as an example, with reference to the accompanying drawing showing a magazine arrangement according to the invention, generally designated by the reference numeral 1.

DETAILED DESCRIPTION OF A PREFERRED EMBODIMENT OF THE INVENTION

This arrangement comprises a number of lengthy, open cassettes 2, and a stand 3 with a base frame 4. The cassettes 2 serve to accommodate a stack of flat objects, which in the case shown are lids 5 for cans.

A charge and/or discharge unit 6 of the type disclosed as an example in the above-mentioned WO patent specification No. 89/10319 serves the purpose of charging or discharging a cassette 2. For this purpose the apparatus 3 has a first path 7 for lengthways carrying the cassette past the charge and/or discharge unit.

In this path are placed two belt conveyers 8 with narrow wedge shaped belts squeezed into feed grooves 10 on each side of the cassette. By means of these belt conveyers 8 the cassette 2 can successively be carried past the charge and/or discharge unit so as to be charged or discharged. A lifting arm 11 on a lifting mechanism 12 furthermore serves the purpose of lifting the cassette 2 up to engagement with the belt conveyers 8 or lowering it so that the belt conveyers can loosen their engagement without a free fall of the cassette.

Instead of the above-mentioned two belt conveyers 8, one single underlying belt conveyer, not shown, can be used, having an endless belt with a coefficient of friction such that the cassettes will not slide down the belt by the gravitation. This belt can, for instance, be supplied with traverse driving ribs able to accommodate the weight of the cassettes in the longitudinal direction, while allowing the cassettes to be crosswise displaced on the belt. In this case there is no need for the lifting mechanism 12 since said underlying belt conveyer is able to support the cassettes in the first path 7 for the full length of this path.

Besides the first path 7, the apparatus has a second path 13 and a third path 14 both of which extend in horizontal direction, respectively, back and forth relative to the first path 7 at an angle of 90° with respect to path 7.

In the second path a belt conveyer 15 is placed having two endless belts 16 and 17 of a smooth material, such as polyester. The belts run around rolls 18 driven by a motor 19.

In the third path 14 there in the same way is placed a belt conveyer 20 with two endless belts 21 and 22 of a smooth material, such as polyester. The belts run around rolls 23 driven by a motor 24.

Below the second path 13 there is furthermore in this case a ledge 26 with a smooth surface or a belt conveyer, not shown, and below the third path 14 there is a ledge 27 with a smooth surface or a belt conveyer, not shown.

The stand 3 with the three paths 7, 13 and 14 is inclined rearwardly relative to the base frame 4 at an angle of inclination v in relation to a horizontal plane. The paths 7 and 14 are situated in principle at substantially the same level relative to stand 3, while the path 13 is somewhat displaced with a minimum distance being the height of the cross section of a cassette. A pusher 29 serves to push a cassette from the second path 13 up to the level of the other two paths.

The apparatus is controlled by means of a switchboard 28 and functions in the following way, under the assumption that the apparatus is used for charging cassettes which are carried through the apparatus in direction of the arrows, and also under the assumption that an operator has put a number of empty cassettes on the ledge 26 and the belt conveyer 15 of the second path 13.

As required, the belt conveyer is dimensioned with a length such that it can accommodate adequately the cassettes so that the operator will have to place new empty cassettes on the belt conveyer 15 only at predetermined time intervals. The rest of the time the apparatus can operate on its own without service and supervision. The manual work necessary is minimized since the difficult work of moving cassettes in and out of the guides of conventional apparatus has been eliminated. The cassettes merely have to be placed in path 13 on a belt conveyer, inclined to the rear, so as to be supported by a lower, smooth ledge, or a lower belt conveyer (not shown), which thereby automatically places the cassettes in correct positions for movement by the belt conveyer 15. The same supporting conditions take effect in the case of the third path 14. The apparatus according to the invention therefore is consequently very labor-saving.

As can be seen, with a stock of empty cassettes on the belt conveyer 15, the cassettes are carried by the conveyer in the direction of the arrows towards the first path 7 where the first cassette in the row will be brought to a halt by a stop 30. The succeeding cassettes will then be packed beside the first one since all of the cassettes will slide on the belts 16 and 17 which thereby act as an accumulator for the cassettes. When a cassette is positioned in first path 7, it is moved downwardly in the direction of the arrow. This cassette is transported stepwise downwards by the belt conveyers 8, while it successively is charged with lids by means of the charge and/or discharge unit 6. As the cassette is released from the belt conveyers 8, is engaged by the arm 11 of the lifting mechanism 12, and is lowered until the lower end of the cassette has been put to rest on to the ledge 27.

When a cassette, moving along the first path 7 has its upper edge is at the same level as the topside of the ledge 26, the next cassette on the belt conveyer 15 in the second path 13 is displaced by the pusher 29 into the first path 7 above the underlying cassette in path 7 so as to follow this cassette downwards until it itself is engaged by the belt conveyors 8 and is charged with lids by means of the charge and/or discharge unit 6.

A cassette which have been charged with lids and lowered onto the ledge 27 of the third path 14 is carried away from the first path 7 by belt conveyor 20 in the direction of the arrows so that there will be room for lowering another filled cassette onto the ledge 27.

As is the case for the second path 13, many cassettes can be accumulated on the third path 14, so the operator only periodically needs to be present to remove the charged cassettes. This operation can very easily take place since the charged cassettes only have to be lifted off the belt, and due to the inclination of stand 3 there is no risk that the lids will fall out during this operation.

The magazine arrangement has above been described under the condition that it is used for charging the cassettes with lids. If, however, it is being used for discharging of cassettes already charged, the process will take place in the reverse order as now will be described.

The charged cassettes are placed on the belt conveyer 20 of the lower horizontally extending path 14 which accumulates a suitable number of charged cassettes and take the first one in the row and moves it to first path 7 to the charge and/or discharge unit 6. The lifting arm 11 of the lifting mechanism 12 elevates the charged cassette into engagement with the belt conveyers 8 which moves the cassette further on past the discharge unit 6, which then successively empties lids from the cassette.

When the cassette is emptied and its lower end has reached the level of ledge 26 of the upper horizontally extending path 13, the empty cassette is lowered by the pusher 29 down to the level of the upper path's belt conveyer 15, which then takes the cassette along the second path 13 in order to make room for another empty cassette. The belt conveyer 15 at the same time serves to accumulate a suitable number of empty cassettes.

As it can be seen, the magazine arrangement is extremely easy to operate, because the apparatus does not, as is the case with conventional apparatuses of this kind, require guides to prevent the upright standing cassettes from tipping over. The guides have been rendered unnecessary by the inclination of the stand 3 whereby gravity is used to hold the cassettes safely in position by abutment against the diagonally lying belt conveyers 13, 14 and the ledges 26, 27. Another advantage obtained by the inclination of the stand 3 is the fact that whether the cassettes are handled manually or whether they are transported through the paths of the apparatus, there is no risk that the lids will fall out. Instead, the lids themselves will seek to move down towards the back of the cassette as a result of gravitation.

It is however, important that the correct angle of inclination v is chosen. If this angle is too large the stack of lids in a cassette will be inclined to slip, and if it is too small there is a risk that the lids will fall out.

In order to safely eliminate these risks the inclination angle v should be between 30° and 85°, preferably between 50° and 80°, and especially between 70° and 80°. At these inclination angles each lid will automatically by gravitation be forced into a position where its plane is perpendicular to the longitudinal direction of the cassette and its lower edge is resting against the bottom of the cassette.

It should be understood that instead of the belt conveyers 15 and 16 in the paths 13 and 14, other kinds of feed mechanisms can be used, e.g. pushers pushing the cassettes along a smooth underlying support. The important fact is that this underlying support be inclined by the angle v in relation to a horizontal plane.

In the figure the two horizontal paths 13 and 14 of the apparatus extend perpendicularly to the left relative to the first path. This configuration is, however, only an example and the two paths can, if required, both extend to the right side and to each side relative to the first path so that the apparatus adequately can be configured for a desired purpose of use.

Furthermore the figure shows one embodiment as an example, which can be used for either charging or discharging of cassettes. However, within the scope of the invention an embodiment can be imagined, wherein these two functions are combined in one single combined apparatus having not only two horizontally extending paths 13 and 14, but paths at each of the ends of these two horizontal paths, so that in this embodiment there are two paths with opposite transportation directions, one of the paths being equipped with a charge unit and the other with a discharge unit.

This apparatus operates in such a way that a number of cassettes circulate in a closed circuit and consequently it is suitable as a buffer between, e.g., eccentric presses making successive operations on stackable objects.

For example, objects from one eccentric press can be stacked in cassettes in the path being equipped with the charge unit, while the succeeding eccentric press is being supplied with these objects for further treatment from cassettes in the path being equipped with the discharge unit. The two presses therefore do not have to operate in time, but can to a great extent operate independently of each other, due to the fact that in a space of time, depending of the number of circulating cassettes, there will be a sufficient number of cassettes for either charging or discharging.

By means of this arrangement the advantage is obtained that two eccentric presses or similar machines can cooperate at the same time even if their operations do not run synchronously. Furthermore a total suspension of operations can be avoided, e.g., in a line of production with several machines, even if one or more of these periodically may stop due to working failure or when worn out or broken tools are to be replaced.

Furthermore the magazine arrangement has been described above under the condition that it is used for can lids. It is obvious to a person skilled in the art that it just as well can be used for many other objects which reasonably can be stacked.

I claim:

1. A magazine arrangement, comprising a plurality of elongated cassettes each having an open front side and a back side, said cassettes being adapted to accommodate a stack of flat objects, and a conveying apparatus for: (a) carrying the cassettes lengthwise in a first path past a charge and/or discharge unit which charges or discharges said flat objects to or from the open sides of said cassettes; (b) carrying the cassettes laterally in a second path towards or away from one end of said first path; and (c) carrying the cassettes laterally in a third path towards or away from the opposite end of said first path, wherein each of said paths includes an inclined support for supporting the back sides of cassettes carried in said paths.

2. A magazine arrangement according to claim 1, wherein the inclined support for each path has an inclination from a horizontal plane of in the range of 30° to 85°.

3. A magazine arrangement according to claim 1 or 2, wherein the inclined supports have the same inclination and wherein said second and third paths extend horizontally and are substantially perpendicular to said first path.

4. A magazine arrangement according to claim 3, wherein the inclined supports for supporting the back sides of cassettes carried in said second and third paths are belt conveyors.

5. A magazine according to claim 4, wherein said belt conveyors are provided with smooth plastic belts.

6. A magazine according to claim 4, wherein each of said belt conveyors are provided with a pair of smooth plastic belts spaced by a distance less than the length of said cassettes.

7. A magazine according to claim 1 or 2, wherein said second and third paths include elongated ledges extending along the bottoms of said second and third paths to support the weight of cassettes located therein.

8. A magazine according to claim 1 or 2, wherein said first path includes a belt conveyor having at least one belt which engages cassettes located in the first path, said belt having a coefficient of function which prevents cassettes from sliding relative to the belt due to gravitation force.

9. A magazine according to claim 1 or 2, wherein said first path includes a belt conveyor having a pair of belts which are spaced by a distance substantially corresponding to the width of said cassettes whereby sides of the cassettes located in the first path are engaged by the belts, said belts having a coefficient of function which prevents cassettes from sliding relative to the belt due to gravitational force.

10. A magazine arrangement according to claim 1 or 2, wherein the inclined supports for each of said paths is mounted on an inclined stand.

11. A magazine arrangement according to claim 1 or 2, wherein said first and third paths lie in a first inclined plane which is parallel to a second inclined plane in which the second path lies.

12. A magazine arrangement according to claim 11, further comprising means adapted to engage said cassettes to displace them between said first and second planes so as to move the cassettes between the first and second paths.

* * * * *